United States Patent
Arquié et al.

(10) Patent No.: US 7,219,300 B2
(45) Date of Patent: May 15, 2007

(54) METHOD AND SYSTEM FOR GENERATING A NETWORK MONITORING DISPLAY WITH ANIMATED UTILIZATION INFORMATION

(75) Inventors: Louis M. Arquié, Cupertino, CA (US); David B. Hamilton, Milpitas, CA (US); Mark R. Lubeck, San Jose, CA (US)

(73) Assignee: SANavigator, Inc., Broomfield, CO (US)

( * ) Notice: Subject to any disclaimer, the term of this patent is extended or adjusted under 35 U.S.C. 154(b) by 628 days.

(21) Appl. No.: 10/671,115

(22) Filed: Sep. 24, 2003

(65) Prior Publication Data

US 2004/0061701 A1    Apr. 1, 2004

Related U.S. Application Data

(60) Provisional application No. 60/415,002, filed on Sep. 30, 2002, provisional application No. 60/415,001, filed on Sep. 30, 2002.

(51) Int. Cl.
*G06F 3/00* (2006.01)

(52) U.S. Cl. ............. 715/736; 715/734; 715/738; 709/224

(58) Field of Classification Search ............ 715/734, 715/736, 737, 738, 735, 853; 345/440; 709/224; 714/724, 43
See application file for complete search history.

(56) References Cited

U.S. PATENT DOCUMENTS

| | | | |
|---|---|---|---|
| 5,278,951 A | 1/1994 | Camacho et al. | |
| 5,586,254 A | 12/1996 | Kondo et al. | |
| 5,909,550 A | 6/1999 | Shankar et al. | |
| 5,910,803 A | 6/1999 | Grau et al. | |
| 6,067,093 A | 5/2000 | Grau et al. | |
| 6,137,782 A | 10/2000 | Sharon et al. | |
| 6,205,122 B1 | 3/2001 | Sharon et al. | |
| 6,381,036 B1* | 4/2002 | Olson | 358/1.9 |
| 6,721,290 B1* | 4/2004 | Kondylis et al. | 370/329 |
| 7,013,433 B1* | 3/2006 | Schorr et al. | 715/825 |
| 2002/0024535 A1* | 2/2002 | Ueno et al. | 345/736 |
| 2002/0095493 A1* | 7/2002 | Byrnes | 709/224 |
| 2003/0061324 A1 | 3/2003 | Atherton et al. | |
| 2003/0105973 A1* | 6/2003 | Liang et al. | 713/200 |
| 2003/0225876 A1* | 12/2003 | Oliver et al. | 709/224 |
| 2004/0155900 A1* | 8/2004 | Huang et al. | 345/736 |
| 2004/0249935 A1* | 12/2004 | Jackson et al. | 709/224 |
| 2005/0039132 A1* | 2/2005 | Germain et al. | 715/736 |
| 2006/0129939 A1* | 6/2006 | Nelles et al. | 715/736 |

* cited by examiner

*Primary Examiner*—Ba Huynh
*Assistant Examiner*—TuyetLien Tran
(74) *Attorney, Agent, or Firm*—Hensley Kim & Edgington, LLC

(57) ABSTRACT

A method for displaying storage network information in a user interface. The method includes identifying a topology map for a storage network and gathering operating information, which is processed to determine a performance parameter, such as utilization. A performance monitoring display is generated including a topology map and a graphical representation of the performance parameter, which is positioned in the display relative to the components for which the parameter applies. The graphical representation can be a pair of parallel dashed lines between communicating components. The dashes in the lines are moved using a speed coding scheme representative of the performance parameter, e.g., with faster speeds used to show higher ranges of utilization, and the direction of movement matches data flow. The dashed lines are colored using a color coding scheme and the line segment lengths vary in association with the performance value.

6 Claims, 8 Drawing Sheets

METHOD AND SYSTEM FOR GENERATING A NETWORK MONITORING DISPLAY WITH ANIMATED UTILIZATION INFORMATION

CROSS REFERENCE TO RELATED APPLICATIONS

This application claims the benefit of U.S. Provisional Application Nos. 60/415,001 and 60/415,002, both filed Sep. 30, 2002, which are incorporated by reference herein in their entireties.

BACKGROUND OF THE INVENTION

1. Field of the Invention

The present invention relates generally to methods and systems for monitoring data storage networks, and more particularly, to a computer-based method and system for determining performance information for components and/or connections of a data storage network and for displaying in a user interface the performance information in an animated fashion that effectively shows a user on a single screen or display the operating status of the data storage network.

2. Relevant Background

For a growing number of companies, planning and managing data storage is critical to their day-to-day business and any downtime or even delays can result in lost revenues and decreased productivity. Increasingly, these companies are utilizing data storage networks, such as storage area networks (SANs), to control data storage costs as these networks allow sharing of network components and infrastructure while providing high availability of data. While managing a small network may be relatively straightforward, most networks are complex and include many components and data pathways from multiple vendors, and the complexity and the size of the data storage networks continue to increase when a company's need for data storage grows and additional components are added to the network.

Generally, a data storage network is a network of interconnected computers, data storage devices, and the interconnection infrastructure that allows data transfer, e.g., optical fibers and wires that allow data to be transmitted and received from a network device along with switches, routers, hubs, and the like for directing data in the network. For example, a typical SAN may utilize an interconnect infrastructure based on Fibre Channel standards that includes connecting cables each with a pair of 1 or 2 gigabit per second capacity optical fibers for transmitting and for receiving data and switches with multiple ports connected to the fibers and processors and applications for managing operation of the switch. SANs also include servers, such as servers running client applications including data base managers and the like, and storage devices that are linked by the interconnect infrastructure. SANs allow data storage and data paths to be shared with all of the data being available to all of the servers and other networked components.

Despite the significant improvements in data storage provided by data storage networks, performance can become degraded in a number of ways. For example, performance may suffer when a network is deployed with few data paths to a storage device relative to the amount of data traffic. In a large SAN, the flow of data is concentrated in Inter-Switch Links (ISLs), and these connections are often the first connections that saturate with data. Also, performance may be degraded when a data path includes devices, such as switches, connecting cable or fiber, and the like, that are mismatched in terms of throughput capabilities, as performance is reduced to that of the lowest performing device. Further, even if the data paths and devices were originally planned to optimize the bandwidth of each critical data path and of device capabilities within the data paths, changes in usage patterns, such as archiving of data and deployment of new applications, and in network devices may significantly alter performance of the network.

A common measurement of performance is utilization, which is typically determined by comparing the throughput capacity of a device or data path with the actual or measured throughput at a particular time, e.g., 1.5 gigabits per second measured throughput in a 2 gigabit per second fiber is 75 percent utilization. Hence, an ongoing and challenging task facing network administrators is managing a network so as to avoid underutilization (i.e., wasted throughput capacity) and also to avoid overutilization (i.e., saturation of the capacity of a data path or network device). These performance conditions can occur simultaneously in different portions of a single network such as when one data path is saturated while other paths have little or no traffic. Underutilization can be corrected by altering data paths to direct more data traffic over the low traffic paths, and overutilization can be controlled by redirecting data flow, changing usage patterns such as by altering the timing of data archiving and other high traffic usages, and/or by adding additional capacity to the network. To properly manage and tune network performance including utilization, monitoring tools are needed for providing performance information for an entire network to a network administrator in a timely and useful manner.

The number and variety of devices that can be connected in a data storage network such as a SAN are often so large that it is very difficult for a network administrator to monitor and manage the network. Network administrators find themselves confronted with networks having dozens of servers connected to hundreds or even thousands of storage devices over multiple connections, e.g., via many fibers and through numerous switches. Understanding the physical layout or topology of the network is difficult enough, but network administrators are also responsible for managing for optimal performance and availability and proactively detecting and reacting to potential failures. Such network administration requires performance monitoring, and the results of the monitoring need to be provided in a way that allows the administrator to easily and quickly identify problems, such as underutilization and overutilization of portions of a network.

Unfortunately, existing network monitoring tools fail to meet all the needs of network administrators. Monitoring tools include tools for discovering the components and topology of a data storage network. The discovered network topology is then displayed to an administrator on a graphical user interface (GUI). While the topology display or network map provides useful component and interconnection information, there is typically no useful information provided regarding the performance of the network. If any information is provided, it is usually displayed in a static manner that may or may not be based on real time data. For example, some monitoring tools display an icon as enlarged for components with higher utilization, which depending on the size of the network may be difficult to identify for an administrator monitoring tens to thousands of paths and components. More typical monitoring tools only provide performance information in reports and charts that show utilization or other performance information for devices in the network at various times. These tools are not particularly useful for determining the present or real time usage of a network as an administrator is forced to sift through many lines and pages of a report or through numerous charts to identify problems and bottlenecks and often have to look at multiple reports or charts at the same time to find degradation of network performance.

Hence, there remains a need for methods and systems for generating performance information for a data storage network and for then providing such performance information to network administrators in a timely and user-friendly manner that facilitates monitoring and managing the network to enhance performance, such as by controlling underutilization and overutilization of components or data paths. Preferably, such methods and systems would provide a single display of the performance information that would allow an administrator to quickly match performance information with particular network components and/or data paths to more effectively manage network operations. Further, preferably such methods and systems would provide real time performance information for a network and would require minimal training of network administrators.

SUMMARY OF THE INVENTION

The present invention addresses the above problems by providing a data traffic monitoring system that functions to determine performance of a data network, such as a data storage network, and to generate a performance monitoring display in a user interface. Significantly, the display includes a map or topology of the network with the performance shown with movement of displayed elements, such as line segments or dashes, to allow a network administrator to readily identify portions of the system that may be over utilized or underutilized as well as those that are being more properly utilized. In one embodiment, movement is used to show utilization of data connections between components of a data network, such as between servers and switches and the like, with the speed the displayed elements are shown to be moving corresponding or being proportional to the amount of utilization, i.e., with faster movement being used for higher utilizations. To show traffic flow in both directions, the display motion or movement includes two, parallel dashed lines that are shown moving in opposite directions to show performance, such as utilization, of a connection corresponding to a transmit and a receive channel of a connection.

In other embodiments, the determined performance parameter is further illustrated in the display by adding color to the "moving" display such that particular performance ranges are essentially color-coded. In some embodiments, the color-coding is used in place of the use of the speed of display movement to indicate status of a performance parameter. In yet other cases, line or dash length is used in combination with color and/or element movement speed to further clarify the display. For example, smaller dashes (or higher dash density) can be used to indicate a connection path is being more highly utilized. Lower utilization (or another parameter) would in contrast be shown with longer lines or dashes (or lower dash density). The process of defining length of the dashes can be described as defining lengths of individual line segments, with shorter line segment lengths used typically to represent higher parameter values, such as higher utilization, and longer line segment lengths used to represent lower parameter values (although in some embodiments, this relationship is reversed).

Preferably, the system acts to periodically obtain updated or real-time performance information and in response, to periodically update the display such that the animation or rate of motion matches existing performance of the network. The display also typically includes a legend that includes motion and is colored as appropriate to show the user the meaning of the display. Further, if varying dash density or dash lengths are utilized, the legend would include similar lines with these dash densities or line segment lengths to indicate the corresponding parameter meaning, e.g., varying levels of data path utilization. In this manner, the system of the invention is able to not only show a topology of a monitored data network but to also effectively show performance information in the same display as the topology (i.e., on a single console or monitor screen), which simplifies monitoring efforts of network administrators.

More particularly, this invention provides a method for displaying storage network monitoring information in a user interface. The method includes identifying a topology map for a storage network, such as by utilizing a discovery mechanism to gather information. Real time operating information is then gathered or received for the storage network, and particularly, for the data transfer portions such as connections and switches. The operating information is then processed to determine a performance parameter, such as utilization of channels of a data connection. The method further includes generating a performance monitoring display that includes at least a portion of the topology map (such as with icons representing the components of the network) and includes a graphical representation of the performance parameter, which is positioned in the display relative to the components for which the parameter is measuring performance.

The graphical representation may be a pair of dashed lines provided between communicatively linked components of the network. The generating then may include showing the dashes in the lines moving at a speed that is selected to represent the determined performance parameter, e.g., with higher display motion speeds used to shown higher utilization, and the dash or line segment motion is provided according to the invention so as to show the dashes in each line moving in a direction that matches data flow in the channel or connection being represented. Further, the line segment length (or dash length) represents the performance parameter with shorter lengths or dashes representing a higher performance parameter value. The generating may further involve displaying the graphical representation, such as lines, in one of a number of colors that are selected based on values or ranges of values of the performance parameter. Hence, the multiple settings or characteristics of the graphical representation can be used individually or in combination to provide an effective visual cue as to the value of the performance parameter and because of the position of the graphical representation the visual cue is quickly tied to the corresponding component of the network, whereby the graphical presentation effectively provides redundant visual coding.

DETAILED DESCRIPTION OF THE PREFERRED EMBODIMENTS

The present invention is directed to an improved method, and associated computer-based systems, for displaying performance information for a data network. The following description stresses the use of the invention for monitoring data storage networks, such as storage area networks (SANs) and network attached storage (NAS) systems, but is useful for monitoring operating performance of any data communication network in which data is transmitted digitally among networked components. An important feature of the method is that performance information, such as utilization of a data connection or link, is displayed in real time along with or as part of the topology of the network. For example, utilization of a data link is shown with the use of a dashed line for each data channel (i.e., transmit and receive), and in one embodiment, the length of the dashes or line segments is used to indicate various utilizations (i.e., the higher the utilization the smaller the dashes or line segments). The performance information is preferably also animated or shown in motion to indicate relative performance of a network component, such as a link, and more preferably the movement of display elements, such as the dashes in a displayed line, is further combined with the speed or rate of motion provided to the display element (e.g., the speed at which dashes are shown to be moving on a display) and/or color to further emphasize and clarify how a component of or portion of a network is performing.

Figure 1:
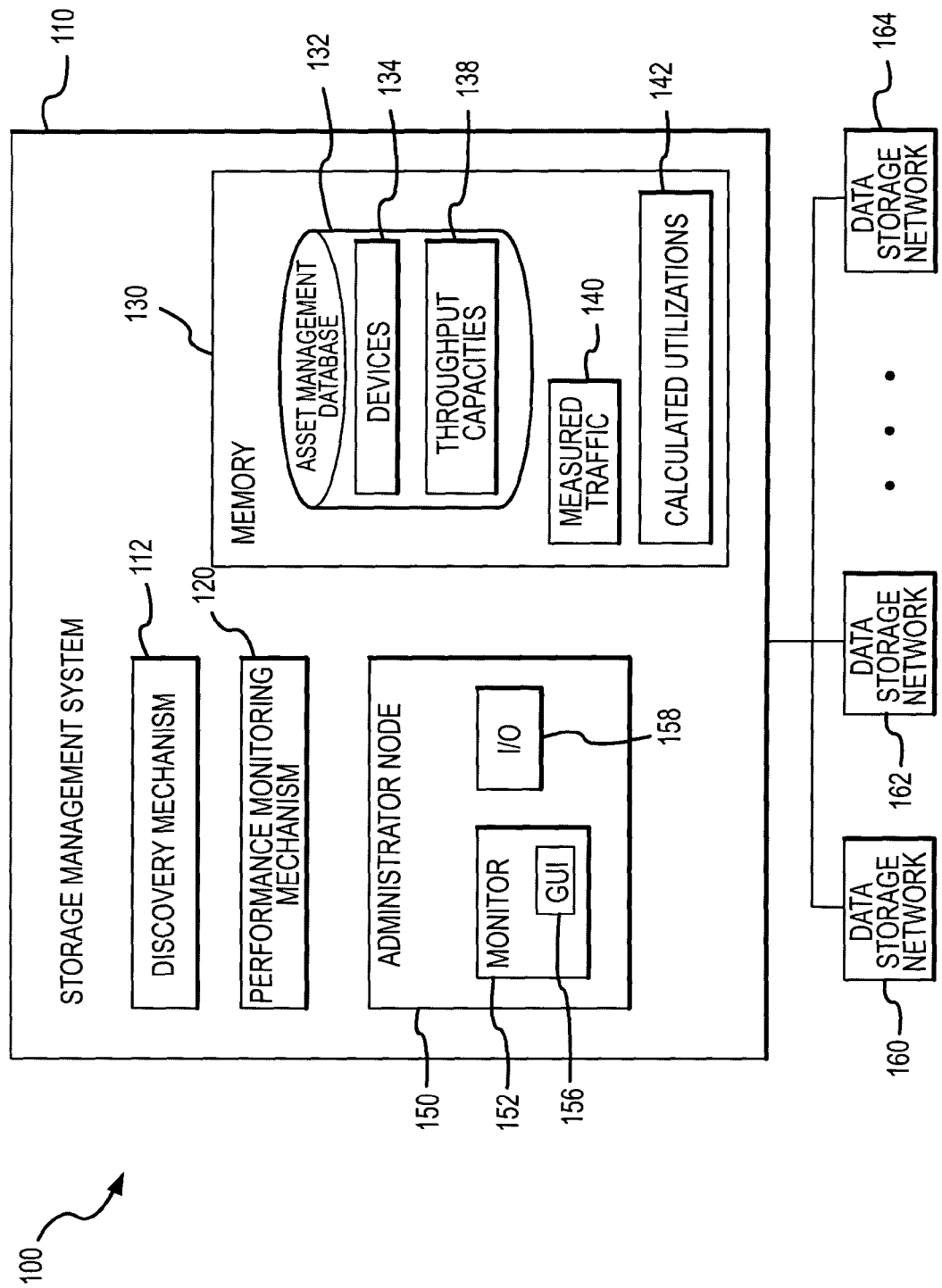
FIG. 1 is a simplified block diagram of a data traffic monitoring system according to the present invention including a performance monitoring mechanism for generating an animated display showing performance parameters relative to a network map or topology.
Figure 8:
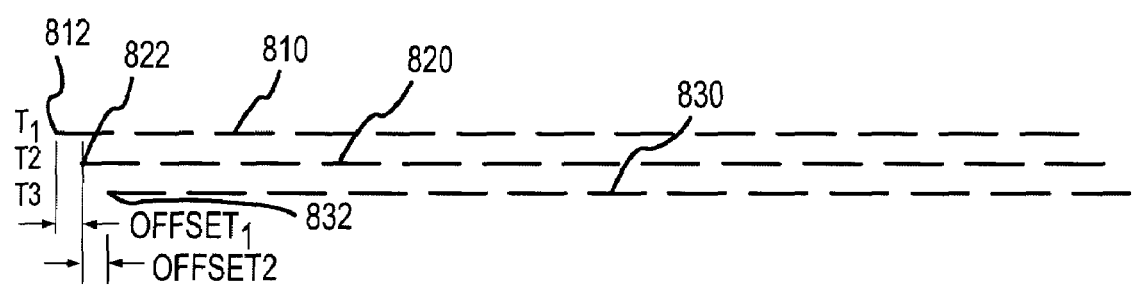
FIG. 8 illustrates a single dashed line that is used to animate traffic flow or utilization at three successive times to show the use of differing offsets to generate movement in one embodiment of the invention.

With this in mind, the following description begins with a description of an exemplary data traffic monitoring system with reference to FIG. 1 that implements components, including a performance monitoring mechanism, that are useful for determining performance information and then generating a display with a network topology or map along with animated performance information. The description continues with a discussion of general operations of the monitoring system and performance monitoring mechanism with reference to the flow chart of FIG. 2. The operations are described in further detail with FIGS. 3–7 that illustrate screens of user interfaces created by the system and performance monitoring system of the invention and which include various displays that may be generated according to the invention to selectively show network performance information. FIG. 8 is provided to help describe one technique for providing movement of performance information.

FIG. 1 illustrates one embodiment of a data traffic monitoring system 100 according to the invention. In the following discussion, computer and network devices, such as the software and hardware devices within the system 100, are described in relation to their function rather than as being limited to particular electronic devices and computer architectures and programming languages. To practice the invention, the computer and network devices may be any devices useful for providing the described functions, including well-known data processing and communication devices and systems, such as application, database, and web servers, mainframes, personal computers and computing devices (and, in some cases, even mobile computing and electronic devices) with processing, memory, and input/output components, and server devices configured to maintain and then transmit digital data over a communications network. The data storage networks 160, 162, 164 may be any network in which storage is made available to networked computing devices such as client systems and servers and typically may be a SAN, a NAS system, and the like and includes connection infrastructure that is usually standards-based, such as based on the Fibre Channel standard, and includes optical fiber (such as 1 to 2 gigabit/second capacity fiber) for transmit and receive channels, switches, routers, hubs, bridges, and the like. The administrator node(s) 150 and storage management system 110 running the discover mechanism 112 and performance monitoring mechanism 120 may be any computer device useful for running software applications including personal computing devices such as desktops, laptops, notebooks, and even handheld devices that communicate with a wired and/or wireless communication network. Data, including discovered network information, performance information, and generated network performance displays and transmissions to and from the elements of the system 100 and among other components of the system 100 typically is communicated in digital format following standard communication and transfer protocols, such as TCP/IP, HTTP, HTTPS, FTP, and the like, or IP or non-IP wireless communication protocols such as TCP/IP, TL/PDC-P, and the like.

Referring again to FIG. 1, the system 100 includes a storage management system 110, which may include one or more processors (not shown) for running the discovery mechanism 112 and the performance monitoring mechanism 120 and for controlling operation of the memory 130. The storage management system 110 is shown as one system but may readily be divided into multiple computer devices. For example, the discovery mechanism 112, performance monitoring mechanism 120, memory 130 and administrator node 150 may each be provided on separate computer devices or systems that are linked (such as with the Internet, a LAN, a WAN, or direct communication links). The storage management system 110 is linked to data storage networks 160, 162, 164 (with only three networks being shown for simplicity but the invention is useful for monitoring any number of networks such as 1 to 1000 or more). As noted above, the storage networks 160, 162, 164 may take many forms and are often SANs that include numerous servers or other computing devices or systems that run applications which require data which is stored in a plurality of storage devices (such as tape drives, disk drives, and the like) all of which are linked by an often complicated network of communication cables (such as cables with a transmit and a receive channel provided by optical fiber) and digital data communication devices (such as multi-port switches, hubs, routers, and bridges well-known in the arts).

The memory 130 is provided to store discovered data, display definitions, e.g., display definitions, movement rates or speeds, and color code sets for various performance information, and discovered or retrieved operating information. For example, as shown, the memory 130 stores an asset management database 132 that includes a listing of discovered devices in one or more of the data storage networks 160, 162, 164 and throughput capacities or ratings for at least some of the devices 134 (such as for the connections and switches and other connection infrastructure). The memory 130 further is used to store measured performance information, such as measured traffic 140 and to store at least temporarily calculated utilizations 142 or other performance parameters.

The administrator node 150 is provided to allow a network administrator or other user to view performance monitoring displays created by the performance monitoring mechanism 120 (as shown in FIGS. 3–7). In this regard, the administrator node 150 includes a monitor 152 with a graphical user interface 156 through which a user of the node 150 can view and interact with created and generated displays. Further, an input and output device 158, such as a mouse, touch screen, keyboard, voice activation software, and the like, is provided for allowing a user of the node 150 to input information, such as requesting a performance monitoring display or manipulation of such a display as discussed with reference to FIGS. 2–7.

The discovery mechanism 112 functions to obtain the topology information or physical layout of the monitored data storage networks 160, 162, 164 and to store such information in the asset management database. The discovered information in the database 132 includes a listing of the devices 134, such as connections, links, switches, routers, and the like, in the networks 160, 162, 164 as well as rated capacities or throughput capacities 138 for the devices 134 (as appropriate depending on the particular device, i.e., for switches the capacities would be provided for its ports and/or links connected to the switch). The discovery mechanism 112 may take any of a number of forms that are available and known in the information technology industry as long as it is capable of discovering the network topology of the fabric or network 160, 162, 164. Typically, the discovery mechanism 112 is useful for obtaining a view of the entire fabric or network 160, 162, 164 from HBAs to storage arrays including IP gateways and connection infrastructure.

Additionally, the discovery mechanism 112 functions on a more ongoing basis to capture periodically (such as every 2 minutes or less) performance information from monitored data storage networks 160, 162, 164. In embodiments which map or display data traffic and/or utilization, the mechanism 112 acts to retrieve measured traffic 140 from the networks 160, 162, 164 (or determines such traffic by obtaining switch counter information and calculating traffic by comparing a recent counter value with a prior counter value, in which case the polling or retrieval period is preferably less than the time in which a counter may roll over more than once to avoid miscalculations of traffic). In one embodiment of the invention, the performance information (including the traffic 140) is captured from network switches using Simple Network Management Protocol (SNMP) but, of course, other protocols and techniques may be used to collect his information. In practice, the information collected by each switch in a network 160, 162, 164 may be pushed at every discovery cycle (i.e., the data is sent without being requested by the discovery mechanism 112). A performance model including measured traffic 140 is sometimes stored in memory 130 to keep the pushed data for each switch.

The performance monitoring mechanism 120 functions to determine performance parameters that are later displayed along with network topology in a network monitoring display in the GUI 156 on monitor 150 (as shown in FIGS. 3–7 and discussed more fully with reference to FIG. 2). In preferred embodiments, one performance parameter calculated and displayed is calculated utilizations or utilization rates 142 which are determined using a most recently calculated or measured traffic value 140 relative to a rated capacity 138. For example, the measured (or determined from two counter values of a switch port) traffic 140 may be 1 gigabit of data/second and the throughput capacity for the device, e.g., a connection or communication channel, may be 2 gigabits of data/second. In this case, the calculated utilization 142 would be 50 percent.

The performance monitoring mechanism 120 acts to calculate such information for each device in a network 160, 162, 164 and to display such performance information for each device (e.g., link) in a displayed network along with the topology. The method utilized by the performance monitoring mechanism 120 in displaying the topology may vary to practice the invention as long as the components of a network are represented along with interconnecting data links (which as will be explained are later replaced with performance displaying links). Further, in some embodiments, the map or topology is generated by a separate device or module in the system 110 and passed to the performance monitoring mechanism 120 for modification to show the performance information. Techniques for identifying and displaying network devices and group nodes as well as related port information are explained in U.S. patent application Ser. No. 09/539,350 entitled "Methods for Displaying Nodes of a Network Using Multilayer Representation," U.S. patent application Ser. No. 09/832,726 entitled "Method for Simplifying Display of Complex Network Connections Through Partial Overlap of Connections in Displayed Segments," and U.S. patent application Ser. No. 09/846,750 entitled "Method for Displaying Switched Port Information in a Network Topology Display," each of which are hereby incorporated herein by reference.

Figure 2:
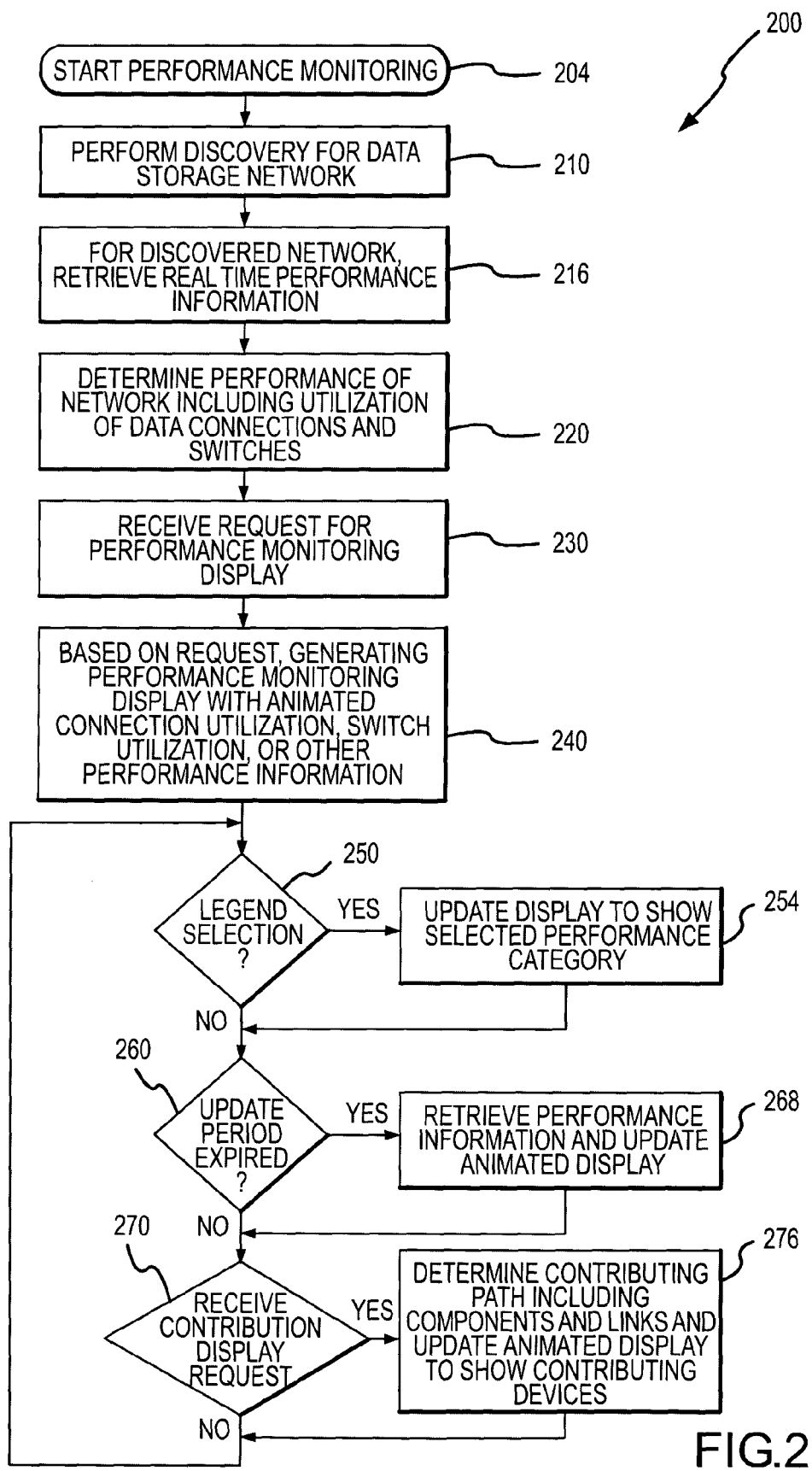
FIG. 2 is a flow chart for one exemplary method of generating performance monitoring displays including moving displayed elements, such as with the performance monitoring mechanism of FIG. 1.

The operation of the storage management system 110 and, particularly, the performance monitoring mechanism 120 are described in further detail in the monitoring process 200 shown in FIG. 2. It should be noted initially that the method 200 is a simplified flowchart to represent useful processes but does not limit the sequence that functions take place, e.g., in typical operation, the system 110 and steps shown in FIG. 2 may be occurring much more asynchronously (e.g., the timers can be asynchronous and the positions of the dashed lines explained below are updated when a timer fires and this is true whether lines are being displayed or not) and often concurrently and possibly in differing threads.

As shown, the monitoring process 200 starts at 204 typically with the loading of discovery mechanism 112 and performance monitoring mechanism 120 on system 110 and establishing communication links with the administrator node 158 and data storage networks 160, 162, 164 (and if necessary, with memory 130). At 210, discovery is performed with the mechanism 112 for one or more of the data storage networks 160, 162, 164 to determine the topology of the network and the device lists 134 and capacity ratings 138 are stored in memory 130. In some embodiments, such discovery information is provided by a module or device outside the system 110 and is simply processed and stored by the performance monitoring mechanism 120.

Figure 3:
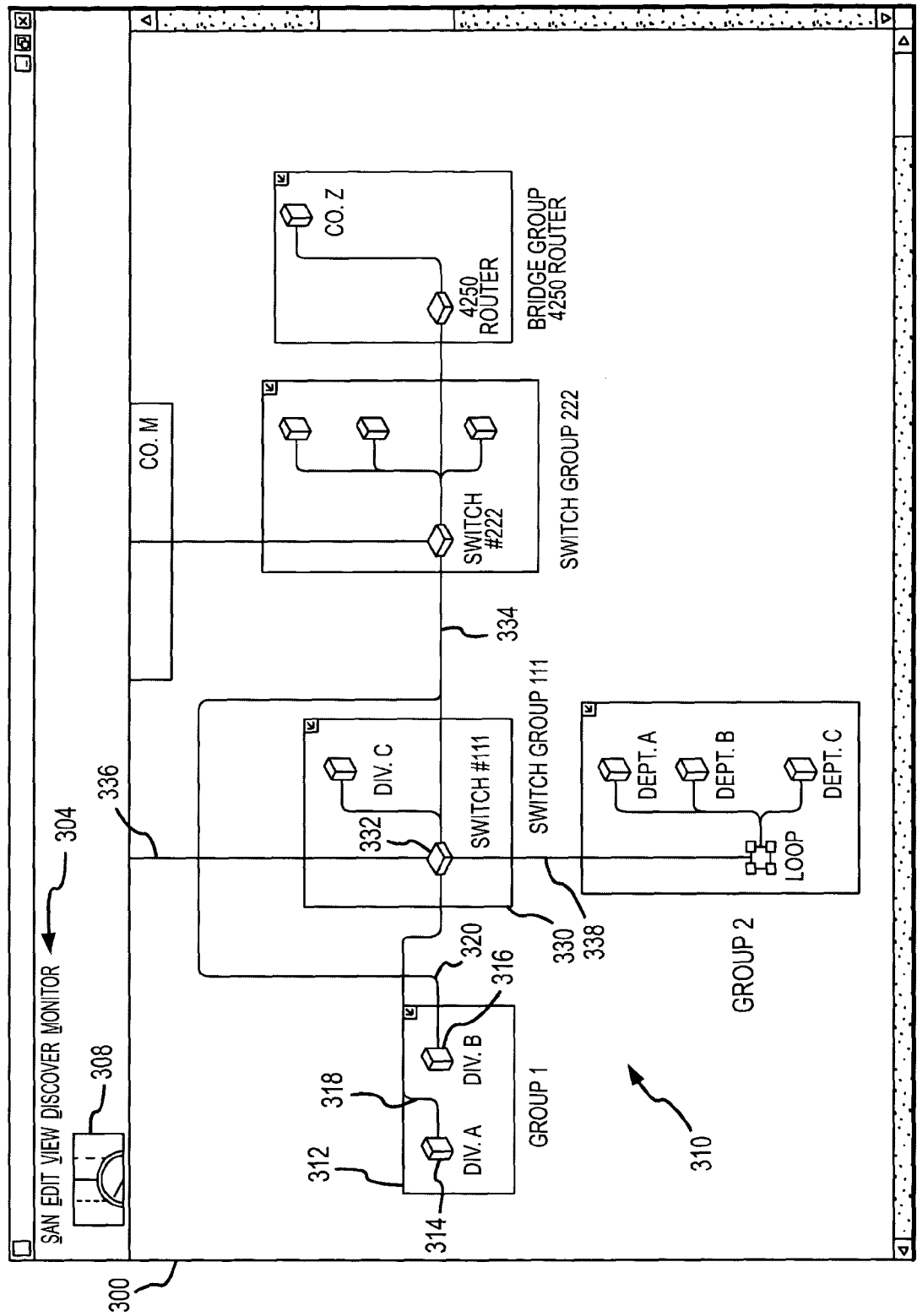
FIG. 3 illustrates a network administrator user interface with a network map or topology generated, such as with information obtained with the discovery mechanism of FIG. 1.

Also, at 210, the performance monitoring mechanism 120 (or other display generating device not shown) may operate to display the discovered topology in the GUI 156 on the monitor 150. For example, screen 300 of FIG. 3 illustrates one useful embodiment of GUI 156 that may be generated by the mechanism 120 (or the mechanism 120 may simply provide the display 310) and includes pull down menus 304 and a performance display button 308, which when selected by a user results (at 230) in performance monitoring mechanism 120 acting to generate a performance monitoring display 400 shown in FIG. 4. The network display 310 is generated to visually show the topology or map of one of the data storage networks 160, 162, 164 (i.e., the user may select via the GUI 156 which network to display or monitor). The network display 310 shows groups of networked components that are linked by communication connections (such as pairs of optical fibers). The display 310 shows this physical topology with icons representing computer systems, servers, switches, loops, routers, and the like and single lines for data paths or connections. The discovered topology in the display 310 includes, for example, a first group 312 including a system 314 from a first company division and a system 316 from a second company division that are linked via connections 318, 320 to switch 332. A switch group 330 is illustrated that includes switch 332 and another division server. The switch 332 is shown to be further linked via links 334, 336, and 338 to other groups and devices. As shown, performance information is not shown in the display 310 but a physical topology is shown and connections are shown with single lines. Note, to practice the invention the physical topology does not have to be displayed but typically is at least generated prior to generating of the performance monitoring display (such as the one shown in FIG. 4) to facilitate creating such a display.

Referring again to FIG. 2, the process 200 continues at 216 with real time information being collected for the discovered network 160, 162, 164 such as by the discovery mechanism 120 either through polling of devices such as the switches or more preferably by receiving pushed data that is automatically collected once every discovery cycle (such as switch counter information for each port). The data is stored in memory 130 such as measured traffic or bandwidth 140. In this manner, real time (or only very slightly delayed) performance information is retrieved and utilized in the process 200. In some embodiments, the discovery mechanism 112 further acts to rediscover physical information or topology information and network operating parameters (such as maximum bandwidth of existing fibers) periodically, such as every discovery cycle or once every so many cycles, so as to allow for changes and updates to the physical or operational parameters of one of the monitored networks 160, 162, 164.

At 220, the performance monitoring mechanism 120 acts to determine the performance of the monitored network 160, 162, 164. Typically, this involves determining one or more parameters for one or more devices. For example, utilization of connections can be determined as discussed above by dividing the measured traffic by the capacity stored in memory at 138. Utilization can also be determined for switches and other devices in the monitored network. The calculated utilizations are then stored in memory 142 for later use in creating an animated display. The performance parameters may include other measurements such as actual transfer rate in bytes/second or any other useful performance measurement. Further, the utilization rate does not have to be determined in percentages but can instead be provided in a log scale or other useful form.

At 230, the process 200 continues with receiving a request for a performance monitoring display from the user interface 156 of the administrator node 150. Such a request may take a number of forms such as the selection of an item on a pull down menu 304 (such as from the "View" or "Monitor" menus) or from the selection with a mouse of the animated display button 308. Typically, such a request is received at the storage management system 110 by the performance monitoring mechanism 120.

Figure 4:
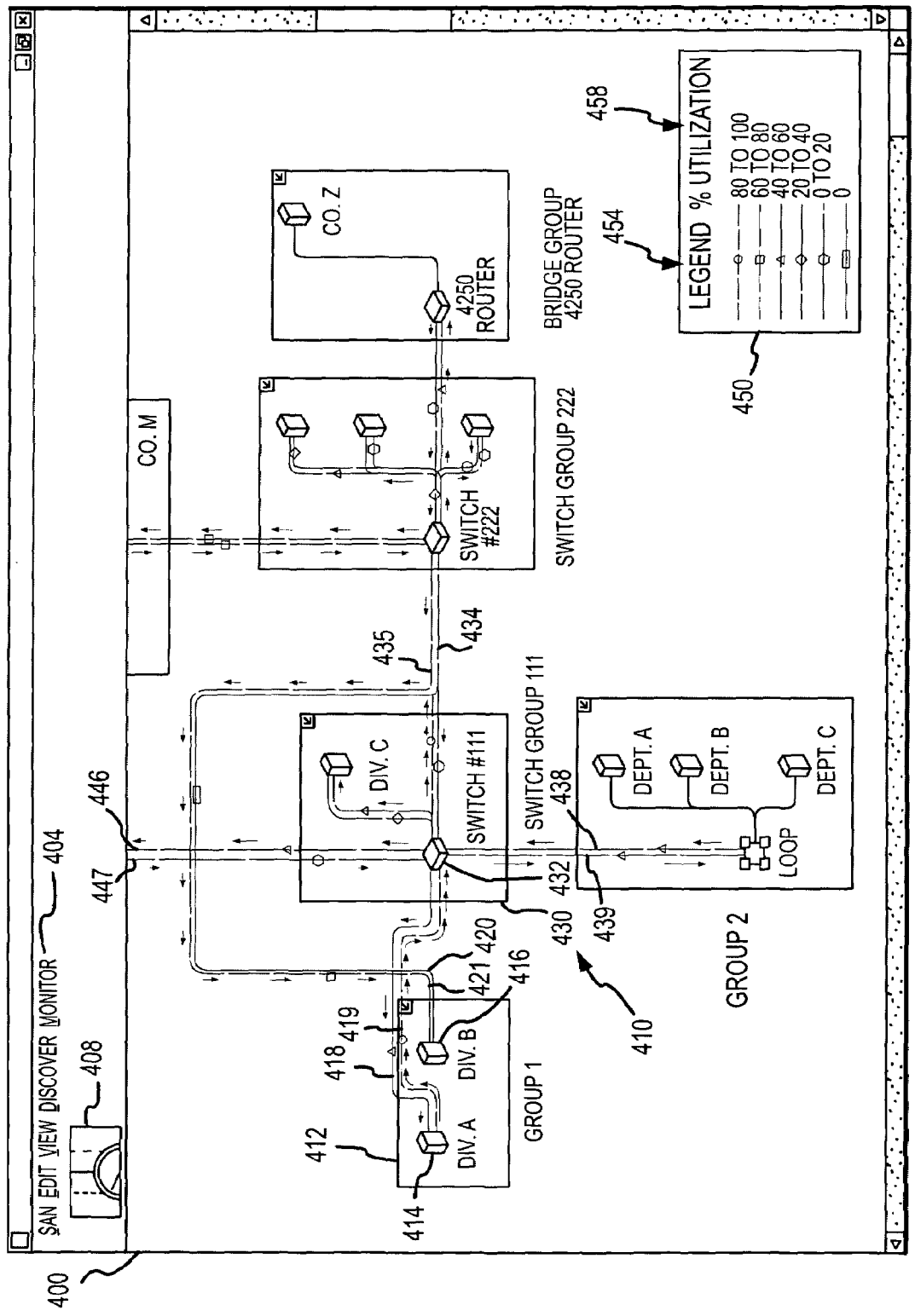
FIG. 4 illustrates the user interface of FIG. 3 with the network map or topology being modified to provide a performance monitoring display that animates one or more operating parameters for the network.

At 240, the performance monitoring mechanism 120 functions to generate a performance monitoring display based using the topology information from the discovery mechanism 112 and the performance information from step 220. A screen 400 of GUI 156 after performance of step 220 is shown in FIG. 4. In the illustrated embodiment, the display 310 of FIG. 3 is replaced or updated to show performance information on or in addition to the topology or map of the network 160, 162, 164 to allow a viewer to readily link performance levels with particular components or portions of the represented network 160, 162, 164. The GUI again includes a pull down menu 404 and a performance monitoring button 408 (which if again selected would revert the display 410 to display 310).

Additionally, the display 410 is different from the pure topology display 310 in that the single line links or connections have been replaced with double-lined connections or performance-indicating links that include a line for each communication channel or fiber, e.g., 2 lines for a typical connection representing a receive channel and a transmit channel. The displays shown in FIGS. 4–7 can also include port information for switches and other components. This is useful for multiport devices for showing more specifically which ports of a switch are being over and/or under utilized.

Referring to FIG. 4, a first group 418 as in FIG. 3 includes a computer system 414 of a first division and a computer system 416 of a second division. Computer system 414 is in communication with switch 432 of switch group 430. However, instead of using a single line to show the connection the real time performance of each channel of the link are shown with the pair of lines 418 and 419. In the illustrated embodiment 410, the performance data being illustrated in conjunction with the network topology is utilization, with the utilization of channel or fiber 418 being 40 to 60 percent and the utilization of channel or fiber 419 being 80 to 100 percent.

There are a number of techniques utilized by the performance monitoring mechanism 120 to show such utilization values in the lines 418, 419. In one embodiment, the utilization variance is represented by using a solid line for zero utilization and a very highly dashed (or small dash length or line segment length) line for upper ranges of utilization, such as 80 to 100 percent. Hence, in this example, the higher number of dashes or shorter dash or line segment length indicates a higher utilization. Gaps are provided in the lines to create the dashes. In one embodiment, the gaps are set at a particular length to provide an equal size throughout the display. Generally, the gaps are transparent or clear such that the background colors of the display show through the gaps to create the dashed line effect, but differing colored gaps can be used to practice the invention.

In a preferred embodiment, a legend 450 is provided that illustrates to a user with a legend column 454 and utilization percentage definition column 458 what a particular line represents. As shown in FIG. 4, the utilization results have been divided into 6 categories (although a smaller or larger number can be used without deviating significantly from the invention with 6 being selected for ease of representation of values useful for monitoring utilization). For example, the inactive links are drawn with a continuous line (no dash and no movement being provided as is explained below) with links that are mostly unused having long dashes (such as 100 pixel or longer segments) and links with the most activity having short dashes (such as 20 pixel or shorter line segments). Note, the display 410 is effective at showing that the flow or utilization in each of the channels 418, 419 can and often does vary, which would be difficult if not impossible to show when only a single connector is shown between two network components. This can be thought of as representing bi-directional performance of a link.

According to a more preferred embodiment and as shown, motion or movement is added to clearly represent the flow of data, the direction of data flow, and also the utilization rate that presently exists in a connection. In the display 410, motion in the dashed lines is indicated by the arrows, which would not be provided in the display 410. The arrows are also provided to indicate direction of the motion of the dashed lines (or line segments in the lines). In most embodiments, the motion is further provided at varying speeds that correspond to the utilization rate (or other performance information being displayed). For example, a speed or rate for "moving" the dashes or line segments increases from a minimum slow rate to a maximum high rate as the utilization rate being represented by the dashed line increases from the utilization range of 0 to 20 percent to the highest utilization range of 80 to 100 percent. While it may not be clear from FIG. 410, such a higher speed of dash movement is shown in the display 410 by the use of more motion arrows on line 419, which is representing utilization of 80 to 100 percent or near saturation, than on line 418, which is representing lower utilization of 40 to 60 percent. In other words, in practice, line 418 would be displayed at a slower speed in a GUI 156 than the line 419. This speed or rate of motion is another technique provided by the invention for displaying performance data on a user interface along with topology information of a monitored data storage network.

To further illustrate the use of movement, connection 420 is shown as representing zero utilization so it is shown as a solid line with no movement. Connection 421 in contrast shows data flowing to system 416 at a utilization rate of 60 to 80 percent. Connection 434 is also shown as solid with no utilization while connection 435 shows flow at a utilization rate of 60 to 80 percent (as will be understood, the motion and use of dashed lines made of line segments having varying lengths also allow a user to readily identify which connection is being shown when the connections overlap as they do in this case with system 416 being connected to Switch #222). Connection 438 is shown with data flowing to switch 432 at a utilization rate of 40 to 60 percent while data is flowing away from switch 432 in connection 439 at a utilization rate of 40 to 60 percent.

Movement of line segments in dashed lines can be achieved in a number of manners to practice the invention. In one embodiment, the single lines of the topology display 310 are first doubled to show optical links having two fibers, one for each transmission direction. The lines are typically kept parallel and are then represented by a dashed line, which has a line segment or dash length that is selected based on the utilization being represented (from a solid line to a line including numerous short line segments or dashes, i.e., see the legend 450 for the dashed and solid lines used for each channel or link). The basis of this technique for displaying movement is to decompose a path between two nodes as a list of simple elements: straight elements, cubic curves, quadratic curves, and the like. The straight segments are relatively easy to then duplicate with parallel elements being provided on both sides of the original topology line (which is then deleted or otherwise not shown in the display 410). The curves require additional work to duplicate and represent because if the path is horizontal coming from the left of the screen or map before the curve and vertical going to the top of the screen or map after the curve then the new path that is above the original topology line or path before the curve also should be on the left of the path after the curve to avoid crossing the original path. Note, single or original lines are still displayed for connections for which there is no available performance information (such as between 4250 Router and the system of Co. Z in Bridge Group 4250 Router).

FIG. 8 is provided to describe how movement of the dashed lines is achieved in an embodiment of the invention. Each link having performance information is doubled as shown in FIG. 4 to represent the transmission of data in both directions. Each branch having data flowing is drawn in the display 410 as a dashed line. To generate motion as shown at 800, the position of the dashed line is changed through time, which "moves" the dashes or line segments of the lines. The movement can be in either direction to match the data flow in the line or fiber being represented in the network. As shown, line 810 is drawn at a first time, $T_1$, with a dash position at location 812. Line 820 is then drawn at a second time, $T_2$, with a dash position at location 822, which is, offset a distance, $Offset_1$, from the location 812. Due to the short time between the two times, the dashed line 820 appears to have moved relative to line 810. Continuing, line 830 is displayed at a third time, $T_3$, with a dash position at a location 832 that is offset a distance, $Offset_2$, from the location 822 of line 820.

Two timers are typically used for generating movement with one timer being used to increment the dashes to ensure that the display movement rate or speed is the same regardless of the rendering speed of the computer used for node 150. The other timer provides a constant delay between each rendering to make sure that this display of movement does not "lock out" the user on a slow computer 150. Note, that the speed of the movement that is used to show higher or lower utilization rates is achieved by varying the amount of the offsets with smaller offsets or position changes used for lower utilization rates (or other performance parameters) and larger offsets or position changes used for higher utilization rates.

The concept of adding movement to a display is definitely not limited to the use of "moving" dashed lines. The use of dashed lines was selected in part to use a smaller portion of screen or display real estate. In other embodiments, though, displays are enhanced by moving (as explained with reference to FIG. 8) one or more objects in the direction of data flow or traffic. The particular object used is nearly unlimited with examples being arrow heads, alpha-numeric characters, marching insects (such as ants), and/or animals (such as a hare for fast or heavily used lines and a tortoise for lightly used lines).

In other embodiments, color is utilized along with (or instead of) the use of movement and/or dash or line segment length to reinforce the overall perception of the performance information in display 410, i.e., to better show link activity to a user of GUI 156. In this embodiment, a different color is assigned to each of the performance ranges. As shown, in the legend 450 the following colors are used (although it should be clear that numerous other colors may be used with varying assignments to the performance levels): gray for inactive links or for the 0 percent utilization category; blue for mostly unused links or for the 0 to 20 percent utilization category; dark green or green/blue for the 20 to 40 percent utilization category; light green or green/yellow for the 40 to 60 percent utilization category; orange for the 60 to 80 percent utilization category; and red for the links near or at saturation or in the 80 to 100 percent utilization category. As noted, other colors may be utilized to indicate performance data with the illustrated colors being selected on an intuitive basis in the color spectrum from blue (e.g., cold) for mostly unused links to red (e.g., hot) for links close to saturation. The color of this lines is shown according to the figure legend shown at the bottom of FIG. 4 and, as with the motion arrows, the symbols would not be shown as part of the display 410.

According to one aspect of the invention, the legend 450 itself utilizes the parameters described above to allow a user to readily identify the performance information definitions and which lines are being used to represent that performance category. As shown in FIG. 4, the lines in the legend are displayed as moving as shown by the arrows, are colored as shown by the symbols, and are also provided with dash size or length matching the lines of the display 410. The lines with motion are also moving at the same speed as the corresponding lines in the display 410, i.e., the line for utilization in the category 0 to 20 percent utilization is "moving" much slower than the line for utilization in the category 80 to 100 percent and these lines are "moving" at the same speed as in the display 410. If only one of these parameters is used or pairs of these three parameters are used to display the performance information, then preferably the legend with movement would also be modified to show the lines as they are shown in the display 410.

Figure 5:
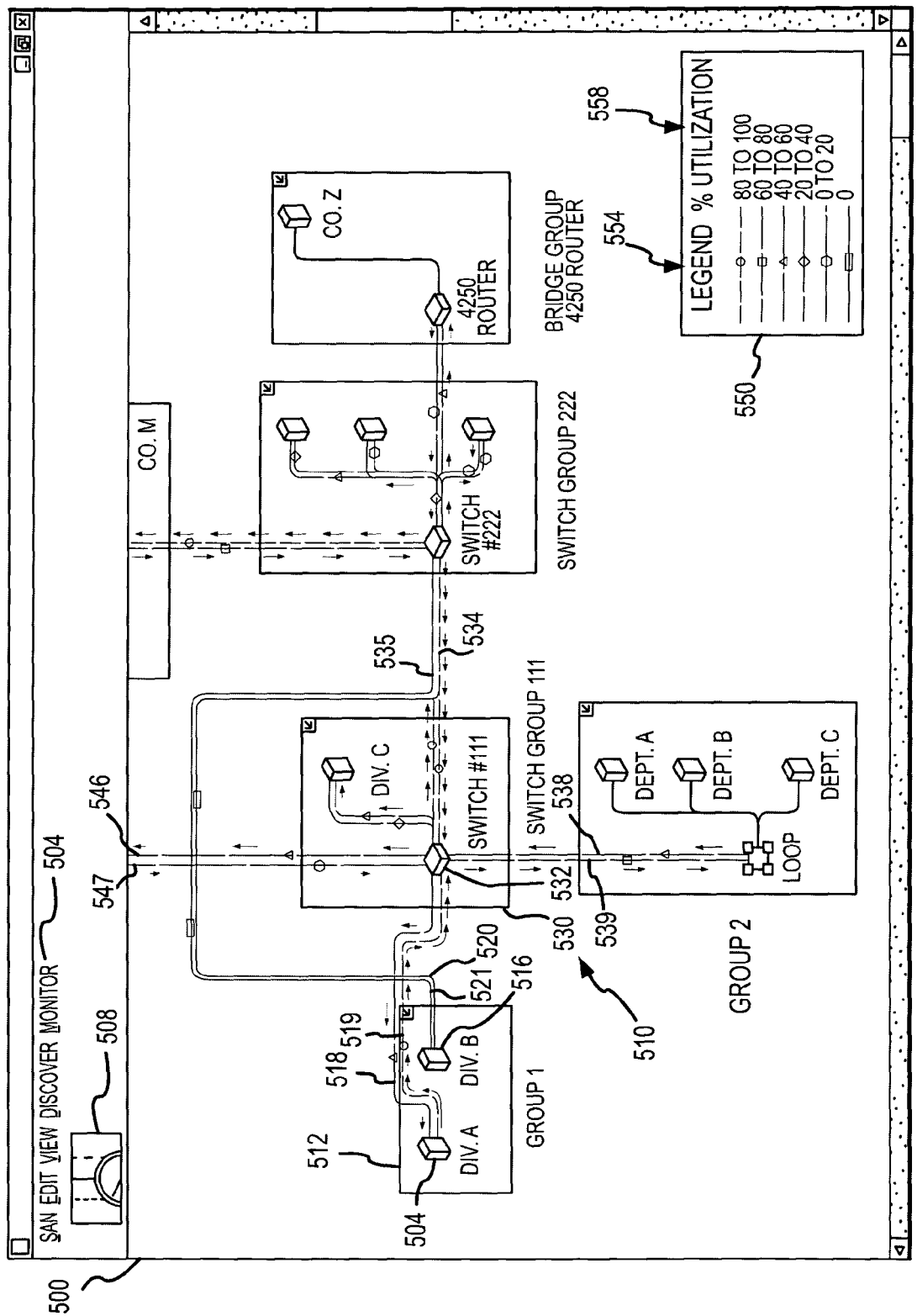
FIG. 5 illustrates in a manner similar to FIG. 4 a performance monitoring display at a second or later time relative to the display of FIG. 4 showing that the performance data is updated on an ongoing basis to show near real time information.
Figure 6:
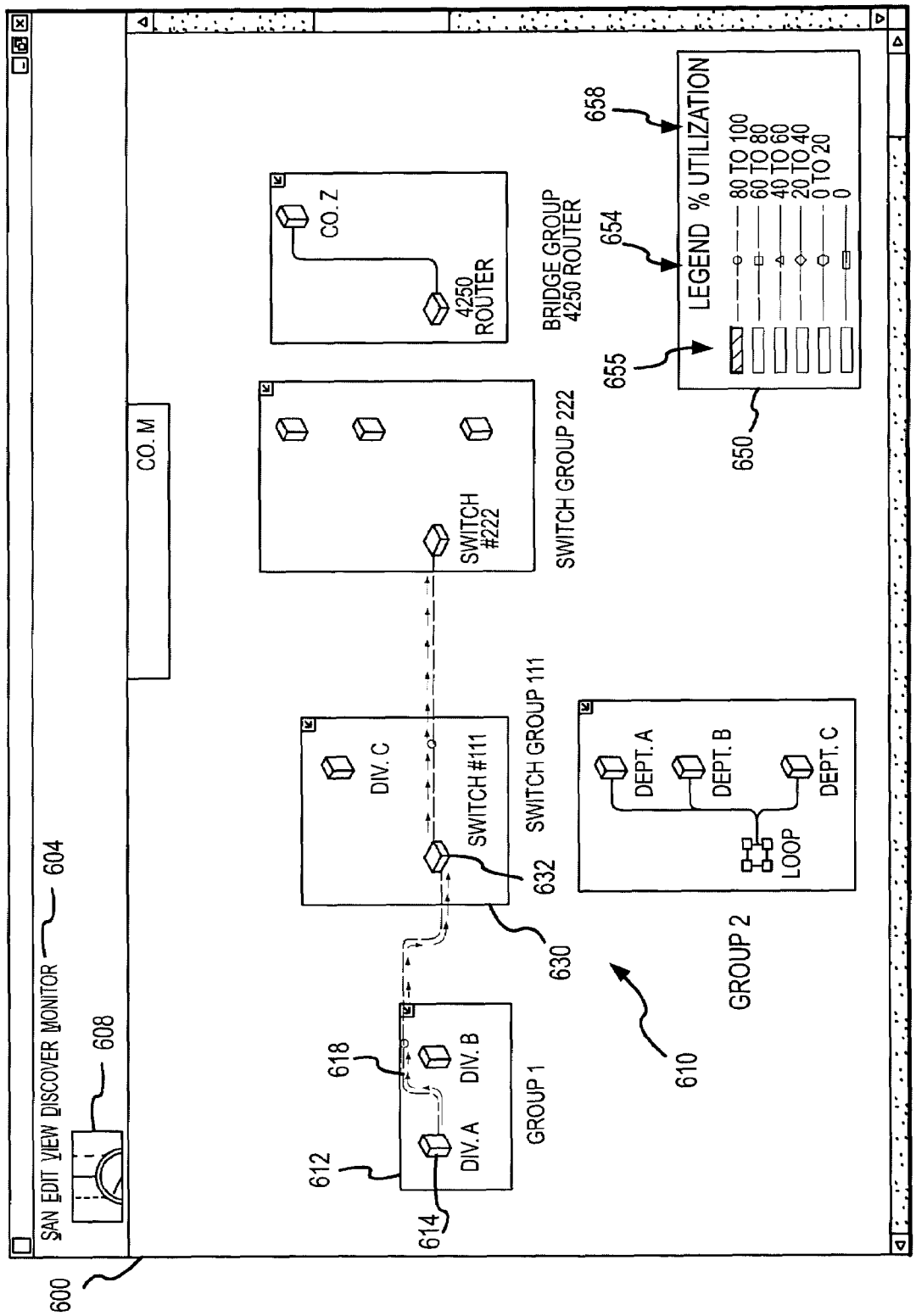
FIG. 6 illustrates another embodiment of a performance monitoring display similar to FIGS. 4 and 5 in which a user of the administrator node of the system of FIG. 1 has selected a button in an active, animated legend and the display is updated by the performance monitoring mechanism to display (or otherwise highlight) the selected paths or connections and/or devices with a particular performance parameter, such as utilization which is shown in FIG. 6.
Figure 7:
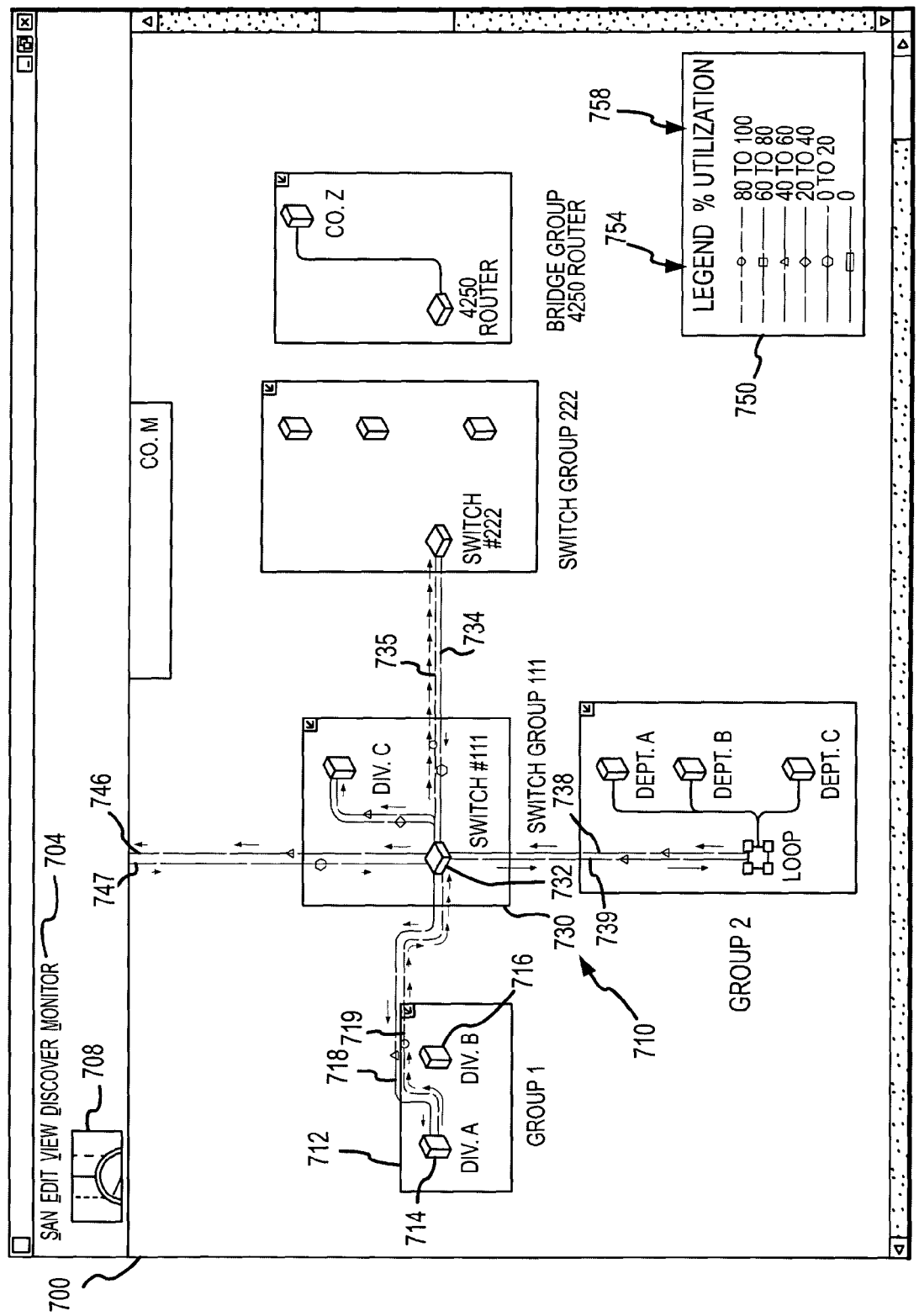
FIG. 7 illustrates yet another embodiment of a performance monitoring display according to the invention in which a user has selected or requested that paths or connections and devices contributing to a particular portion of the traffic, such as the switch shown to be selected in FIG. 7, and only the contributory paths or connections are shown in the performance monitoring display.

FIG. 6 illustrates a GUI 600 according to another embodiment of the invention. In this GUI 600, the legend 650 is an active or dynamic legend. The GUI 400 includes many of the same features such as pull down menus 604, performance monitoring selection button 608, and provides a display 610. However, with this GUI 600, the process 200 can continue at 250 with checking to determine if a legend selection has been made, and when a selection is received, the process 200 continues at 254 with the updating of the display (such as that in FIG. 4 or 5) to show the selected performance category.

Referring again to FIG. 6, the legend 650 is shown to have buttons 655 in the utilization category column 654. These buttons 655 allow a user of the GUI 600 to select a particular utilization category for illustration in the display 610. In other embodiments (not shown), the "buttons" could be the moving segments themselves as the segments could be painted on top of buttons to allow the user to click on the segments/buttons. As illustrated, the button 655 corresponding with the 80 to 100 percent utilization category defined in column 658 has been selected. In response to such selection at 250, the performance monitoring mechanism 120 functions to only show the selected utilization category, i.e., the 80 to 100 percent category in this example. As illustrated, only this category is shown with the other connections being deleted or hidden in the display 610. Such a "mini-map" can be used for easy location of the category or categories being selected, which can be quite useful in large topologies. In other embodiments, the other, unselected category connections may simply be altered such that the selected category is highlighted. For example, the color may be removed, the movement may be removed, the use of dashes may be terminated (i.e., show the unselected categories as double or single lines), or some combination of these techniques may be used.

The process 200 of FIG. 2 then continues at 260 with a determination if a display update period has expired. According to one aspect of the invention, the displays provided by the performance monitoring mechanism 120 provide real time or only slightly delayed performance information. To this end, the process 200 checks to see if some predetermined update period has passed at 260 and when it has, then the mechanism 120 acts at 268 to retrieve new performance information, when necessary calculate parameters such as utilization, and then update the display. Typically, the update period is set to approximately coincide with the discovery cycles used in the system 100 (such as every 2 minutes or less). FIG. 5 illustrates a GUI 500 with an updated display 510 relative to display 410 of FIG. 4. As can be seen, several of the connections are displayed differently to show that the performance data (in this case, the utilization of the data connection or at least one of the channels) has changed during the update period. In this manner, the display 510 is freshened in ongoing manner without requiring user action (such as by pressing a "refresh" button, although this technique may be used in some embodiments of the system 100) to show real time performance information relative to the network topology. If discovery processes are stopped or unavailable for all or a portion of the network being monitored 160, 162, 164, the performance monitoring mechanism 120 preferably indicates this on the display 410, 510, such as by creating a "freeze frame" by halting movement or by otherwise altering the display 410, 510 in a fashion that makes it clear there is a problem (such as by reverting to all solid lines or simply displaying a message indicating a discovery problem has arisen).

Referring again to FIG. 2, the monitoring process 200 continues at 270 with receiving a contribution display request, such as from a GUI 156 in node 150 of FIG. 1. In some embodiments of the invention, the performance monitoring mechanism 120 is adapted to receive a request from a user to display paths and/or components that contribute to data traffic. The data traffic will typically be on a particular data path, through a particular network component (such as a switch, hub, router, or the like) or in/out of a particular component (such as client system or server or a storage device including databases and the like). Such data traffic or contribution can be determined with known devices, such as "packet sniffers" or similar mechanisms, that are useful for identifying data flow paths, sources, and/or destinations in networks. The selected "device" for such monitoring can simply be the one with a selected amount of traffic (such as "show me the highest (lowest or other ranking) device and contributors"). The monitored traffic and/or contributors may also be determined based on the I/O chain or may be derived from any of the levels often used to model the I/O chain (such as volumes, files, or other levels).

One exemplary GUI 700 is shown upon such a contribution request at 270 and after the completion of step 276 to determine contributing pathways including the components and links and to update the animated display 710 to show the contributing devices. As shown, the contribution request received at 270 requested contributors to traffic at switch 732. In response to this request, the performance monitoring mechanism 120 acts to determine which devices and connections feed data in and out of switch 732 and then generates the display 710 which only displays the identified "contributors" to the switch traffic (or otherwise highlights such contributors as discussed relative to the display 610). In this example, the display 410 of FIG. 4 is modified to only display the contributors to traffic at switch 732, which include system 714, links 718, 719, links 746, 747, links 434, 435 (and Switch #222 and in many cases, devices and links connected to this switch would also be displayed or highlighted as contributors), links from Div. C, and links 438, 439 along with one or more components from Group 2.

This example is simplified to facilitate illustration, but the example is believed useful to demonstrate this aspect of the invention that could be used to identify traffic patterns and potential problem areas in a data storage network. In practice, an application may be selected such as database and all contributors to the database and the data paths from contributing devices would be shown in the display generated at 276. This can be a useful tool for clients who are often unsure of which "contributors" to traffic in a network 160, 162, 164 are the heavy users or, in other words, which contributors (such as a particular company, a division of a company, a particular application, a particular storage device, and the like) are creating traffic and/or utilization problems. Once identified, such problems can be addressed by managing data flow relative to the heavy contributors or high traffic devices, and the contribution display feature of the performance monitoring mechanism 120 enhances identifying these problems.

The above disclosure sets forth a number of embodiments of the present invention and particularly, embodiments in which three line or graphical parameters (i.e., length of segments in a line, color used for the lines, and the speed or rate of motion) are used to encode performance information into a network monitoring display. Other arrangements or embodiments, not precisely set forth, could be practiced under the teachings of the present invention and as set forth in the following claims. For example, the use of utilization rate as the displayed performance information for connections was selected because it allows network administrators to rapidly and effectively identify which connections (or switches or other components) are being saturated or over utilized or are being underutilized. However, it does not indicate the amount of data flow without further information. Hence, in some embodiments of the invention (not shown), the performance information shown in the performance monitoring displays is the measured traffic or data flow rates measured in each connection. Again, ranges are established between 0 and a maximum throughput, such as 2 gigabits/second or more and each range is represented by motion, dash density, movement speed, and/or color (or a combination of these techniques). When connections are shown to overlap, the mechanism 120 can use a number of techniques in determining which to display. In some cases, the connection with a highest utilization (or other performance value) is shown and in others, a simpler topology rule is utilized, such as showing the connection with the longest path or originating from a device in a group with a higher sequential ranking (such as by identifier and the like).

In some embodiments, the process 200 is altered to allow additional user input to the display configuration. For example, the GUI 156 in some cases provides an initialization screen or pull down menu that enables a user of the GUI 156 to modify the default categories and display settings of the performance monitoring mechanism 120. In one embodiment, the user is allowed to assign the colors to the utilization categories (or other performance information being illustrated), and in another, the user is allowed to define the utilization or performance parameter categories (such as by moving the ranges for each category or even defining the number of such categories, e.g., may only desire to monitor 0 percent, 0 to 80 percent, and 80 to 100 percent for utilization).

The user in some cases can also add or delete display settings, such as by removing the movement feature but retaining the color and dash density settings or by adjusting or removing the varying speed of motion setting. The user may also select a setting that highlights particular performance information, such as saturation of a connection or component. In this case, the user may request an alarm be set for utilization above a certain value (rather than simply within a range) or may further highlight troublesome performance, such as by adding a "blinking" feature to a displayed connection or device, e.g., if a connection is utilized over 95 percent at any time the user may request that the line be shown as blinking or flashing rather than just moving to indicate there is saturation or near saturation of the line or device. Further, in some cases, this "alarm" setting can be maintained through more than one update or discovery cycle to force the user to investigate what is now historic data.

We claim:

1. A computer-based method for displaying storage network monitoring information, comprising:
   identifying a topology map for a storage network;
   receiving operation information for the storage network;
   processing the operation information to determine a performance parameter; and
   for a user interface, generating a performance monitoring display including at least a portion of the topology map and a graphical representation of the performance parameter;
   wherein the performance parameter is based on data traffic in a data connection of the storage network and wherein the performance parameter representation is displayed to indicate motion, the motion having a direction corresponding to the data traffic in the data connection;
   wherein the performance parameter representation is further displayed to move at a speed that is selected to indicate ranges of values for the performance parameter;
   wherein the performance parameter representation includes two parallel lines comprising dashes separated by a distance and wherein the dashes in one of the lines moves in a first direction and the dashes in the other one of the lines moves in a second direction opposite of the first direction to represent two channel data flow, the performance parameter representation being positioned in the display so as to replace the data connection in the topology map.

2. The method of claim 1, wherein each of the dashed lines is shown to be moving by displaying a dashed line with a first position at a first time and then displaying the dashed line with a second position offset a distance from the first position at a second time.

3. The method of claim 1, wherein the dashes in each of the lines have a size selected based on the value of the performance parameter corresponding to each of the lines, wherein the size is selected to be inversely proportionate to the performance parameter corresponding to each of the lines.

4. A computer storage medium storing computer-executable instructions for performing a computer process that displays storage area network monitoring information, the computer process comprising:
   identifying a topology map for a storage network;
   receiving operating information for the storage network;
   processing the operating information to determine a performance parameter; and
   for a user interface, generating a performance monitoring display including at least a portion of the topology map and a graphical representation of the performance parameter;
   wherein the performance parameter is based on data traffic in a data connection of the storage network and wherein the performance parameter representation is displayed to indicate motion, the motion having a direction corresponding to the data traffic in the data connection;
   wherein the performance parameter representation is further displayed to move at a speed that is selected to indicate ranges of values for the performance parameter;
   wherein the performance parameter representation includes two parallel lines comprising dashes separated by a distance and wherein the dashes in one of the lines moves in a first direction and the dashes in the other one of the lines moves in a second direction opposite of the first direction to represent two channel data flow, the performance parameter representation being positioned in the display so as to replace the data connection in the topology map.

5. The computer storage medium of claim 4 wherein each of the dashed lines is shown to be moving by displaying a dashed line with a first position at a first time and then displaying the dashed line with a second position offset a distance from the first position at a second time.

6. The computer storage medium of claim 4 wherein the dashes in each of the lines have a size selected based on the value of the performance parameter corresponding to each of the lines, wherein the size Is selected to be inversely proportionate to the performance parameter corresponding to each of the lines.

* * * * *